(12) United States Patent
Abraham

(10) Patent No.: US 7,438,339 B2
(45) Date of Patent: Oct. 21, 2008

(54) VEHICLE SEAT

(75) Inventor: James Abraham, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 54 days.

(21) Appl. No.: 11/579,522

(22) PCT Filed: May 3, 2005

(86) PCT No.: PCT/EP2005/004780

§ 371 (c)(1),
(2), (4) Date: Nov. 3, 2006

(87) PCT Pub. No.: WO2005/108150

PCT Pub. Date: Nov. 17, 2005

(65) Prior Publication Data

US 2007/0222251 A1    Sep. 27, 2007

(30) Foreign Application Priority Data

May 5, 2004   (DE) .................. 10 2004 022 706

(51) Int. Cl.
*B60N 2/02* (2006.01)
(52) U.S. Cl. .................. 296/65.09; 296/65.12
(58) Field of Classification Search ............. 296/65.09, 296/65.13, 65.01, 69, 67, 65.05; 297/14
See application file for complete search history.

(56) References Cited

U.S. PATENT DOCUMENTS

| | | | | |
|---|---|---|---|---|
| 501,896 A | * | 7/1893 | McAneny et al. ............. | 297/13 |
| 656,583 A | * | 8/1900 | Levin ........................... | 297/13 |
| 3,236,556 A | * | 2/1966 | Lathers ..................... | 296/65.08 |
| 3,253,856 A | * | 5/1966 | Ueda ........................... | 296/68 |
| 4,155,587 A | * | 5/1979 | Mitchell ................... | 296/65.12 |
| 4,479,752 A | * | 10/1984 | Todd ......................... | 296/65.12 |
| 4,609,221 A | * | 9/1986 | Bottcher ................... | 296/65.09 |
| 5,042,864 A | * | 8/1991 | Mochizuki ................. | 296/65.07 |
| 5,524,952 A | * | 6/1996 | Czech et al. ............. | 296/65.12 |
| 5,636,884 A | * | 6/1997 | Ladetto et al. ........... | 296/65.09 |
| 6,231,103 B1 | | 5/2001 | Elson et al. | |

(Continued)

FOREIGN PATENT DOCUMENTS

DE    195 22 685    5/1966

(Continued)

OTHER PUBLICATIONS

International Search Report for PCT/EP2005/004780, date of mailing Jul. 27, 2005, 3 pages.

*Primary Examiner*—Kiran B. Patel
(74) *Attorney, Agent, or Firm*—Foley & Lardner LLP

(57) ABSTRACT

A vehicle includes a seat part and a backrest which together are configured to be pivoted about a generally vertically aligned pivot axis from a use position into an entry position and from the use position into a cargo position. The seat part is configured to be substantially perpendicular to the backrest in the use position and the entry position. The seat part is configured to be substantially parallel to the backrest in the cargo position. The seat part and the backrest are configured to be pivoted at least approximately 30 degrees from the use position into the entry position. The seat part and the backrest are configured to be pivoted approximately 90 degrees from the use position into the cargo position.

11 Claims, 3 Drawing Sheets

U.S. PATENT DOCUMENTS

| | | | |
|---|---|---|---|
| 6,460,922 B1 * | 10/2002 | Demick | 296/65.11 |
| 6,572,189 B1 * | 6/2003 | Blaymore | 297/256.12 |
| 6,629,729 B2 * | 10/2003 | Wiedeman et al. | 296/65.09 |
| 6,692,051 B1 * | 2/2004 | Cook et al. | 296/65.11 |
| 7,000,968 B2 * | 2/2006 | Welch et al. | 296/68 |

FOREIGN PATENT DOCUMENTS

| | | |
|---|---|---|
| DE | 689 05 521 | 11/1993 |
| DE | 195 22 967 | 1/1996 |
| DE | 100 62 125 | 6/2002 |
| DE | 10 2004 022 706 | 12/2005 |
| EP | 0 358 285 | 3/1990 |
| WO | WO 03/016090 | 2/2003 |

* cited by examiner

VEHICLE SEAT

CROSS-REFERENCE TO RELATED PATENT APPLICATIONS

The present Application is a National Phase Application of PCT/EP2005/004780 entitled, "Vehicle Seat, Particularly for a Motor Vehicle" filed on May 3, 2005 which published under PCT Article 21(2) on Nov. 17, 2005 as WO 2005/108150 A1 in the German language, which claims priority to German Patent Application DE 10 2004 022 706.3 filed May 5, 2004, the entire disclosure of which, including the specification and drawings, is expressly incorporated herein by reference.

BACKGROUND

The present disclosure relates generally to a vehicle seat. More particularly, the present disclosure relates to a vehicle seat for a motor vehicle, with a seat part and a backrest which can be pivoted from a use position oriented in the direction of travel to the side into an entry position making it easier to get to the seat.

European Patent Specification EP 0358285 B1 discloses a vehicle seat of the generic type for a motor vehicle which serves to transport people and has two lateral sliding doors. The motor vehicle is equipped with front seats which can each be pivoted from their use position by an angle of 45 degrees toward the opening of the sliding doors into a position which makes it easier, in particular for older or disabled passengers, to get to the seat. Furthermore, after slight pivoting of the backrest forward toward the cockpit, the front seats can be displaced from their use position into an "easy-entry position" which permits access to a conventional rear seat bench.

Vehicle seat configurations or interiors of this type do not provide for moving the vehicle seats into a position which enlarges the free space of the vehicle, thereby enlarging the loading volume of the vehicle.

Accordingly, there is a need for improving the variability of the seat concept known from the prior art.

SUMMARY

One exemplary embodiment relates to a vehicle seat that can be selectively moved from a use position into a cargo position which enlarges the loading volume of the vehicle. In the cargo position, the seat is brought into a position in which the seat does not substantially obstruct a loading of the vehicle floor, or, by means of a corresponding kinematics, it even becomes part of the loading floor.

According to another exemplary embodiment, the vehicle seat can advantageously be pivoted about an essentially vertical pivot axis, about 30 degrees to 60 degrees, in particular approximately 45 degrees, to the side into an entry position. Such movement can be realized with a justifiable outlay even in the case of vehicles with a conventional door arrangement and makes it easier for a seat occupant to get to the seat from a position outside the vehicle interior.

According to a further exemplary embodiment, the pivot axis about which the seat is rotated into the entry position is provided at the rear, outer side region of the vehicle seat. Often, there will be sufficient construction space there with regard to both the seat and the vehicle body. Furthermore, in this design, the integration of a seat having this kinematics into vehicle bodies having a conventional door arrangement requires a relatively low outlay.

Another exemplary embodiment relates to a vehicle seat having a seat base part and a seat backrest. To achieve the cargo position, the seat base part is configured to be folded upward into an essentially vertical position parallel to the seat backrest. Once the seat base part is folded upward, the vehicle seat can subsequently be rotated to the side forward or rearward about an angle into the cargo position. For example, the vehicle seat may be configured to rotate approximately 90 degrees when moving between the use position and the cargo position.

Another exemplary embodiment relates to a vehicle seat configured to rotate about a first axis of rotation between a use position and an entry position and about the same axis of rotation between the use position and a cargo position.

Another exemplary embodiment relates to a vehicle rear seat bench of a four- or five-door vehicle. The rear seat bench is divided into at least two, preferably three, vehicle seats arranged next to one another, of which the outer vehicle seats can be pivoted in the direction of the associated door openings of the vehicle body into an entry position. To reach a cargo position, after the seat parts are folded upward, vehicle seats of this type are preferably rotated in front of the same door opening.

According to another exemplary embodiment, the vehicle seat can be further improved with regard to its variability in that the seat part can be raised, preferably by means of a spindle drive, from its use position into a child seat position parallel thereto. Even when the child seat function is used, the entry position of the vehicle seat makes it easier to get to the seat.

DETAILED DESCRIPTION

Figure 1:
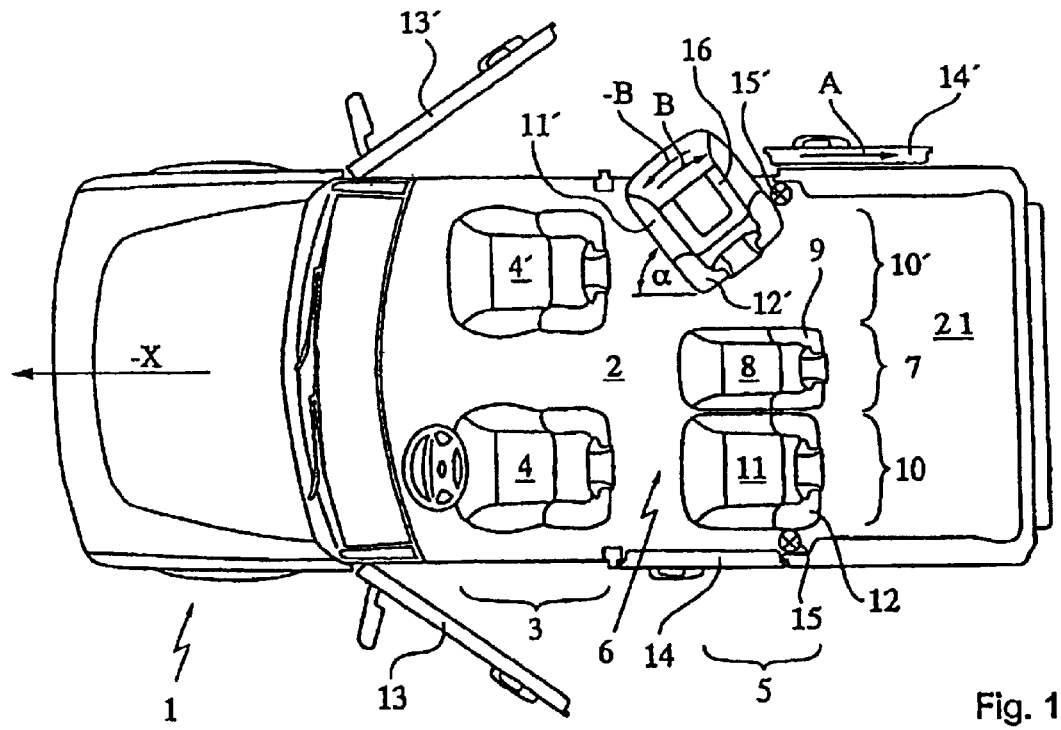
FIG. 1 is a top view of the interior of a vehicle according to a exemplary embodiment showing a first rear vehicle seat in an entry position and a second rear vehicle seat in a use position.

Referring to FIG. 1, a motor vehicle 1 having an interior 2 with a front seat row 3 comprising two individual seats 4, 4' and a rear seat row 5 having a rear seat bench 6 is shown according to an exemplary embodiment. According to the embodiment illustrated, the front individual seats 4, 4' for a driver and a front passenger are of conventional design and are therefore not described in more detail below.

Referring further to FIG. 1, the rear seat bench 6 is shown as being divided into three portions (e.g., sections, segments, seats, etc.). Specifically, the rear seat bench 6 is shown as having a narrow central segment 7 with a seat part 8 and a backrest 9 and two vehicle seats, which are realized in a mirror-inverted manner, in the form of side segments 10, 10' with seat parts 11, 11' and backrests 12, 12'.

The interior 2 is accessible in the region of the front seat row 3 via lateral pivoting doors 13, 13' and in the region of the rear seat row 5 via lateral sliding doors 14, 14' which can be displaced to the rear (in the direction of arrow A) for opening purposes. As shown in FIG. 1, when the sliding door 14 is closed, the side segment 10 is in the use position. According to an exemplary embodiment, when the side segment 10 is in the use position, the backrest 12 is oriented substantially vertically when in the use position, while the seat part 11 being oriented substantially horizontally in such a manner that a seat occupant faces in the primary direction of travel (as shown by the arrow −X).

After the opening of the sliding doors 14, 14' and the release of a lock (not shown), the side segments 10, 10' can each be moved to an entry position. The entry position is achieved by pivoting the side segments 10, 10' about a vertical pivot axis 15, 15', which runs in the rear, outer region of the side segments 10, 10', about an angle α outward in the direction of the arrow B, as illustrated for the side segment 10'. According to an exemplary embodiment, angle α is approximately 45 degrees. In this lockable entry position, it may be easier to get to the side segment 10' for adult seat occupants and/or for children who are to be placed in a child seat 16 anchored on the side segment 10'.

After the side segment 10' is occupied by a seat occupant, it can be pivoted back, after the lock is released, manually or by means of an electric drive in the direction of the arrow −B into the use position. Before the side segment 10' is moved back to the use position, the seat occupants may be secured by a belt system (not shown) integrated in the side segment 10'. According to an alternative embodiment, the belt system may be anchored to the vehicle body in a manner that the belt system is only accessible to a seat occupant when the side segment 10' is in the use position.

Figure 2:
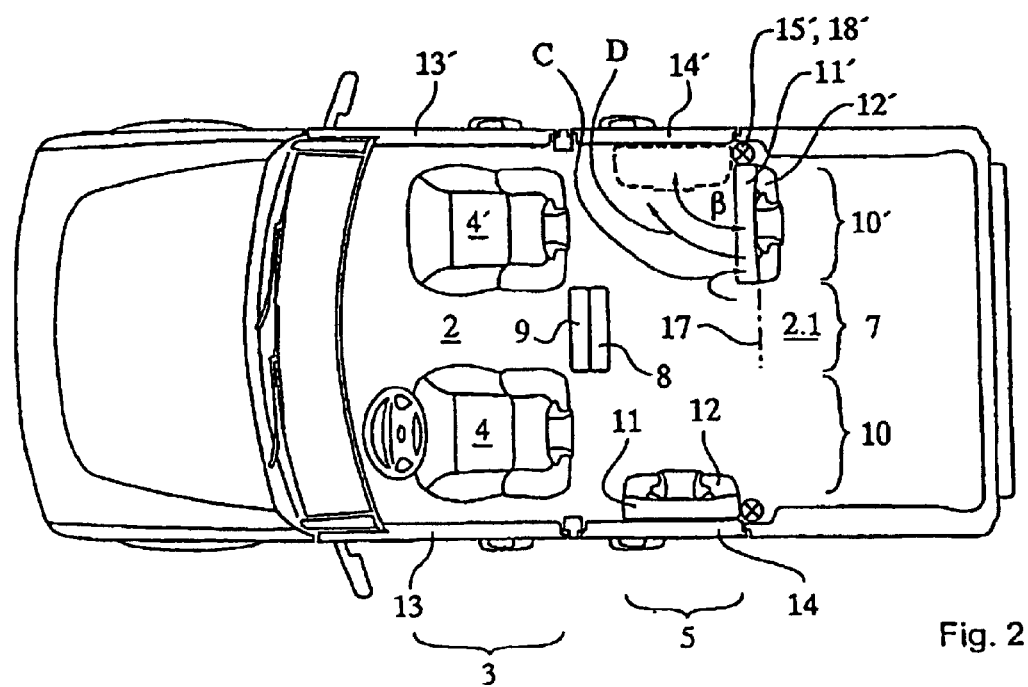
FIG. 2 is a top view of the interior of the vehicle of FIG. 1 showing the first rear vehicle seat in an intermediate position and the second rear vehicle seat in a cargo position.
Figure 4:
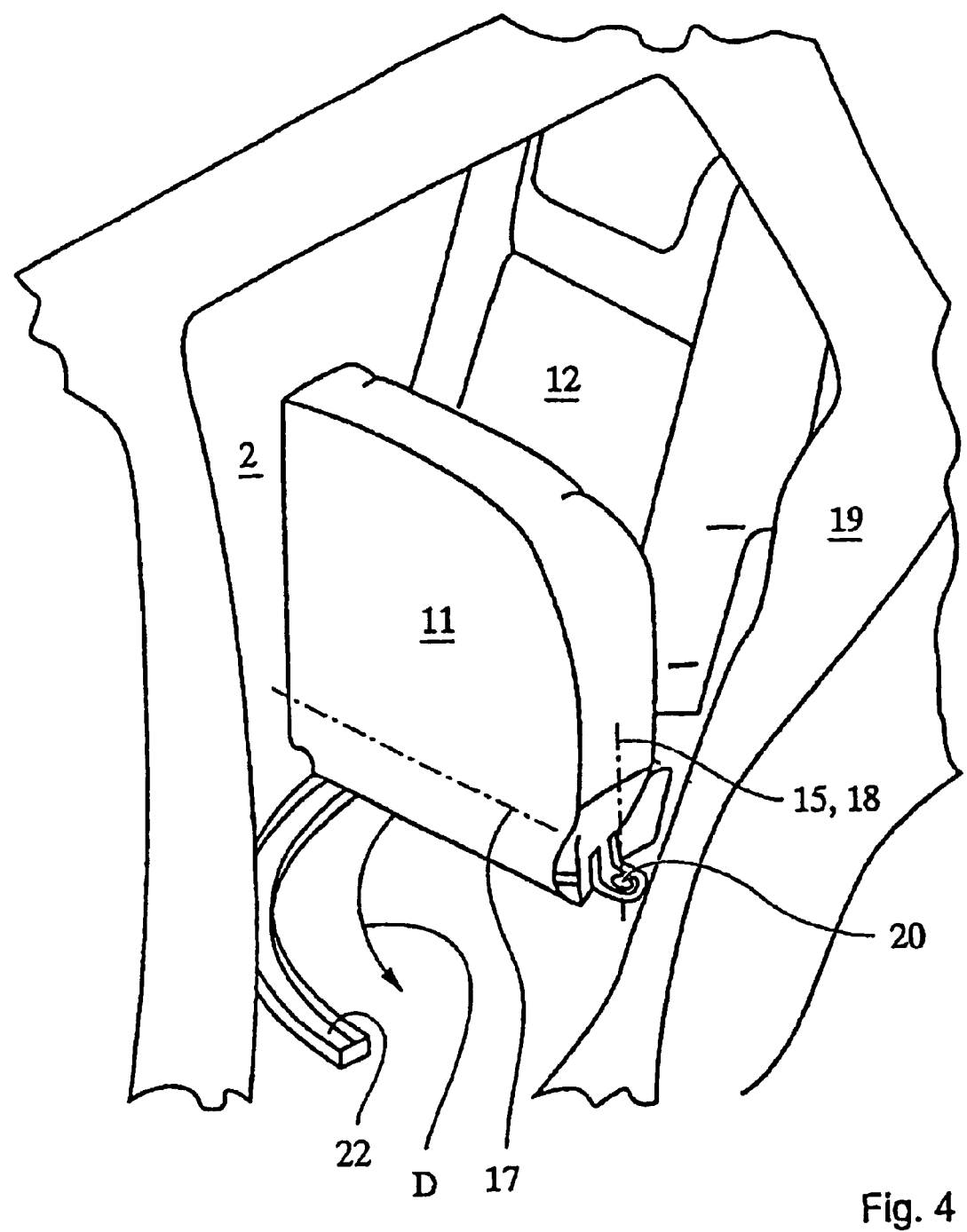
FIG. 4 is a perspective view of the vehicle seat of FIG. 3 shown in the intermediate position.

To enlarge the loading space of the vehicle, either individual side segments or both of the side segments 10, 10' and the central segment 7 of the backrest 6 can be shifted or otherwise moved into a cargo position which is shown in FIG. 2. To move the side segment 10' from the use position into the cargo position, the seat part 11' is folded upward (in a direction shown by the arrow C) about a horizontal folding axis, which is arranged in the region of the transition between seat part 11' and backrest 12' and runs transversely to the direction of travel −X, until the seat part 11' bears against the backrest 12' (as shown in FIG. 4). In addition to moving the seat part 11', the side segment 10' is rotated outward by an angle β about an axis of rotation 18' to a position in front of the vehicle body opening for the sliding door 14' (in a direction shown by the arrow D) and is secured in such a position (e.g., by being anchored relative to the vehicle, etc.). According to an exemplary embodiment, angle β is approximately 90 degrees. In the exemplary embodiment, the axis of rotation 18' for moving side segment 10' into the cargo position and the pivot axis 15' for moving side segment 10' into the entry position coincide or are otherwise the same in order to reduce the structural outlay and are arranged in a fixed position in the interior 2. Movement of the side segment 10 between the use position, the entry position and/or the cargo position can take place in the same manner as detailed above with reference to the side segment 10'. Movement of the side segments 10, 10' from the cargo position back into the use position takes place analogously in a reverse sequence.

Referring further to FIG. 2, the central segment 7 can be transferred from a use position into a cargo position by folding the backrest 9 forward onto the seat part 8 and pivoting the package produced in this manner forward into a vertical cargo position, in which the package produced is arranged approximately between the backrests of the front individual seats 4, 4'.

Figure 3:
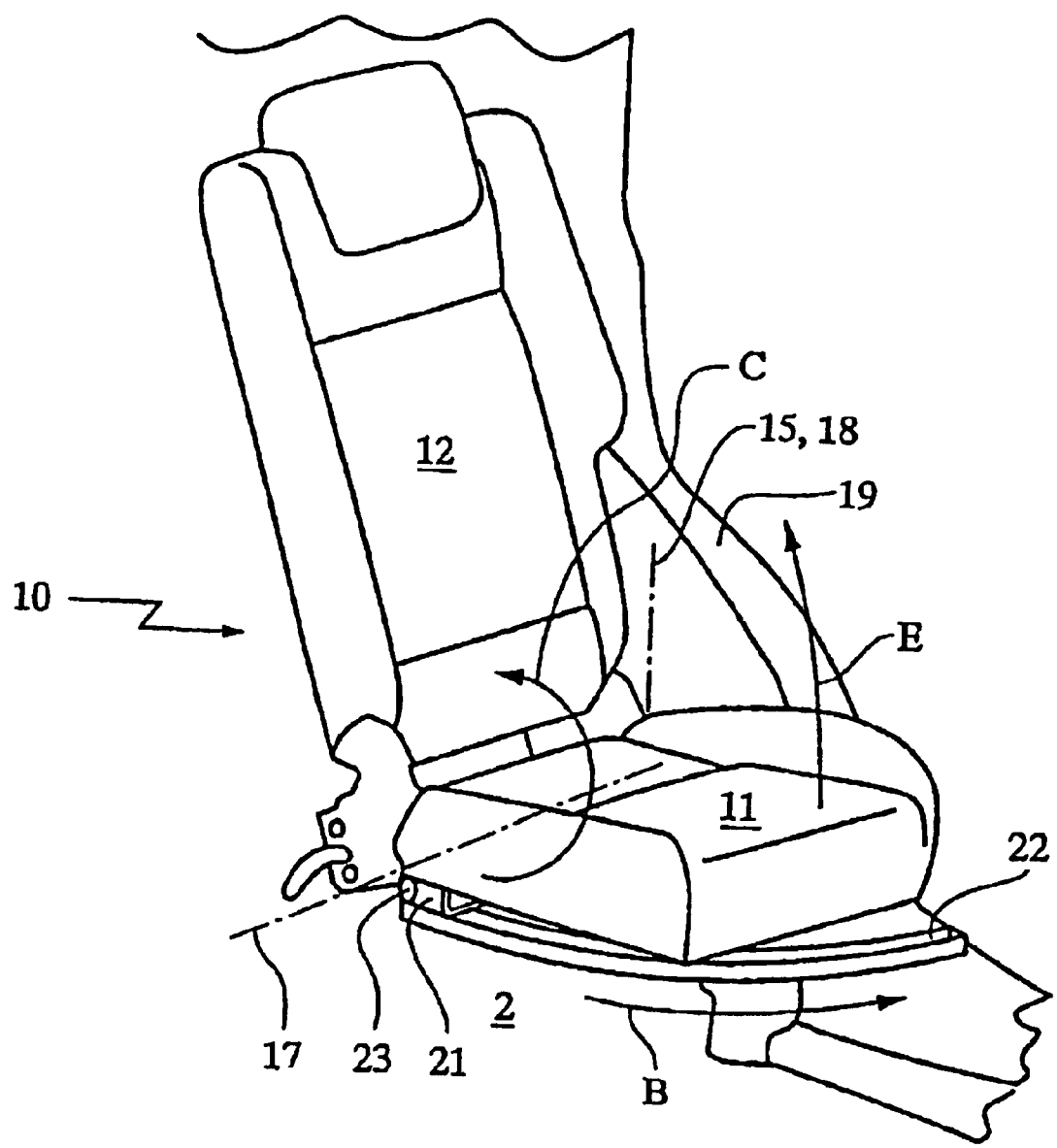
FIG. 3 is a perspective view of a vehicle seat according to an exemplary embodiment shown in the use position.

Referring to FIG. 3, the side segment 10 is shown according to an exemplary embodiment. The side segment 10 is shown in the use position from the interior 2 of the vehicle. Referring to FIG. 4, the side segment 10 is shown in the an intermediate position from outside of the vehicle through the opening of the sliding door 14.

Referring to both FIGS. 3 and 4, the side segment 10 is shown as being equipped in a rear region of the seat part 11, which region faces a side wall of a vehicle body 19, with a pivot device (shown as a rotary bearing 20) which forms the vertical pivot axis 15 and axis of rotation 18. The opposite lateral side of the seat part 11 is provided with a follower (shown as sliding bearing 21) which runs in a guide mechanism (shown as a slotted guide mechanism 22) surrounding the pivot axis 15 below the seat part. According to an exemplary embodiment, the slotted guide mechanism 22 is in the form of a circular arc. The sliding bearing 21 includes locking means (not shown) which selectively engages the slotted guide mechanism 22 or a structure proximate the slotted guide mechanism 22. The locking means can be selectively released by means of a pushbutton 23 in order to move the side segment 10 between the entry position, the use position and/or the cargo position. The side segment 10 is also provided with bearing or articulating means which facilitates movement of the seat part 11 about the folding axis 17 into the intermediate position (shown in FIG. 4) and/or the cargo position.

It should be noted that the inventions disclosed in this application are not restricted to the exemplary embodiment. For example, it is possible for not only rear seat segments but also front seats to be fitted out in accordance with the inventions.

The invention claimed is:

1. A vehicle seat comprising:
   a seat base part and a seat backrest which together are configured to be pivoted about a generally vertically aligned pivot axis from a use position into an entry position and from the use position into a cargo; and
   a follower supported at the vehicle seat and configured to engage a guide mechanism while the seat base part and the seat backrest are pivoted between the use position and the entry position and between the use position and the cargo position,
   wherein the seat base part is configured to be substantially perpendicular to the seat backrest in the use position and the entry position, wherein the seat base part is configured to be substantially parallel to the seat backrest in the cargo position, wherein the seat base part and the seat backrest are configured to be pivoted about the generally vertically aligned pivot axis at least approximately 30 degrees from the use position into the entry position, and wherein the seat base part and the seat backrest are configured to be pivoted about the generally vertically aligned pivot axis approximately 90 degrees from the use position into the cargo position.

2. The vehicle seat of claim 1, wherein seat base part and the seat backrest are configured to be pivoted about the generally vertically aligned pivot axis less than approximately 60 degrees from the use position into the entry position.

3. The vehicle seat of claim 1, wherein the pivot axis is provided at a first rear side region of the vehicle seat.

4. The vehicle seat of claim 1, wherein the seat base part of the vehicle seat is configured to be folded upward into a substantially vertical position parallel to the seat backrest in the cargo position.

5. The vehicle seat of claim 4, wherein the seat base part and the seat backrest are configured to be pivoted from the use position to the cargo position after the seat base part has been folded upward into the substantially vertical position.

6. The vehicle seat of claim 1, wherein the seat base part is configured to remain in the substantially perpendicular position while the seat base part and the seat backrest rotate between the use position and the entry position.

7. The vehicle seat of claim 3, wherein the follower is provided at a second rear side region of the vehicle seat opposite the first rear side region.

8. The vehicle seat of claim 1, wherein the vehicle seat is part of a vehicle rear seat bench.

9. The vehicle seat of claim 8, wherein the rear seat bench is divided into at least two outer vehicle seats that are configured to be pivoted in a direction of an associated door opening into the entry position.

10. The vehicle seat as of claim 9, wherein the outer vehicle seats are configured to be rotated in front of the associated door opening into the cargo position.

11. The vehicle seat of claim 9, wherein the vehicle seat further comprises a center vehicle seat positioned between the two outer vehicle seats.

* * * * *